United States Patent Office

3,655,632
Patented Apr. 11, 1972

3,655,632
PROCESS FOR THE PRODUCTION OF AROMATIC POLYBENZIMIDAZOLES
Yoshio Ohfuji, Kuraschiki, and Tamotsu Eguchi, Okayama, Japan, assignors to Kuraray Co., Ltd., Kuraschiki, Japan
No Drawing. Filed Sept. 15, 1970, Ser. No. 72,537
Int. Cl. C08g 33/02
U.S. Cl. 260—78.4 N     10 Claims

ABSTRACT OF THE DISCLOSURE

A high molecular weight aromatic polybenzimidazole can be readily obtained by heating a mixture of an aromatic tetramine and an aromatic dinitrile in the presence of an ammonium salt of an inorganic acid or an organic sulfonic acid.

---

This invention relates to a process for the production of high molecular weight aromatic polybenzimidazoles having high thermal stability.

It is well known that high molecular weight compounds containing benzimidazole rings and aromatic nuclei in their molecular chain have high melting points and a high degree of thermal stability.

It is also considered generally impossible to obtain aromatic polybenzimidazoles, especially of high molecular weight, by merely heating a mixture of aromatic tetramines and aromatic dicarboxylic acids or derivatives thereof.

One method of preparing high molecular weight aromatic polybenzimidazoles comprises melt polymerizing an aromatic tetramine and a diphenyl ester or an anhydride of an aromatic dicarboxylic acid at an elevated temperature and thereafter further polymerizing the product of the melt polymerization in the solid state (see U.S. Pat. No. 3,174,947). However, according to this process, in order to produce polymers of sufficiently high molecular weight to be suitable for practical use, it is necessary to finely pulverize the product of the melt polymerization prior to polymerization in the solid state and to conduct the solid state polymerization at an elevated temperature under a reduced pressure of less than 0.5 mm. Hg or at an elevated temperature and in an inert gas stream over a long period of time.

Thus, the process disclosed in U.S. Pat. No. 3,174,947 requires several complicated operations. In addition, since the reaction is conducted over a long period of time at an elevated temperature, it tends to form insoluble and infusible polymers.

One method which has heretofore been proposed to overcome the above-mentioned deficiencies involves the solution polymerization of an inorganic acid salt of an aromatic tetramine and a dicarboxylic acid or a derivative thereof with heat in polyphosphoric acid (see U.S. Pat. No. 3,313,783). According to this process, the polymer product after completion of the reaction can be separated by pouring the reaction mixture in the form of a polyphosphoric acid solution into a large quantity of water. However, this separation procedure is complicated and moreover, it is difficult to recover and reuse the polyphosphoric acid. Thus, this process is not generally considered satisfactory for the commercial production of polybenzimidazoles.

Accordingly, it is an object of this invention to provide a new and improved process for preparing aromatic polybenzimidazoles.

Another object of this invention is to provide a process for preparing aromatic polybenzimidazoles of high molecular weight by mere heating of the reactants.

These as well as other objects are accomplished by the present invention which provides a process for preparing aromatic polybenzimidazoles comprising heating a mixture of an aromatic tetramine containing two groups of amine substituents, said amine substituents in each group being in an ortho position relative to each other, and an aromatic dinitrile, at a temperature sufficiently high to maintain at least one of the reactants in a molten state at least during the initial stage of the reaction, in the presence of an ammonium salt of an acid selected from the group consisting of inorganic acids and organic sulfonic acids, until the polycondensation reaction is completed.

It has been found that when a mixture of an aromatic tetramine and an aromatic dinitrile is heated at a temperature above about 250° C., aromatic polybenzimidazoles of relatively high molecular weight can be obtained by polycondensation in bulk. However, if it is desired to produce polymers of extremely high molecular weights by this process, the reaction must be conducted at a relatively high temperature and over a relatively long period of time. As a result, infusible and insoluble polymers may often be formed by a side reaction such as a cross linking reaction. Thus, this process still can have difficulties associated therewith.

According to this invention it is possible to increase the velocity of the bulk polycondensation reaction between the aromatic tetramine and the aromatic dinitrile without the difficulties mentioned above. This can be achieved by effecting the bulk polycondensation reaction in the presence of, as a reaction promoter, an ammonium salt of an inorganic acid or an ammonium salt of an organic sulfonic acid. As a result, according to this invention, it becomes possible to employ a relatively low reaction temperature and a relatively short reaction period thus producing aromatic polybenzimidazoles of extremely high molecular weights without the risk of accompanying side reactions.

In this invention it is considered advantageous to use compounds such as illustrated below as the aromatic tetramines, or the aromatic tetra-primary amines which contain two groups of amine substituents, said amine substituents in each group being in an ortho position relative to each other:

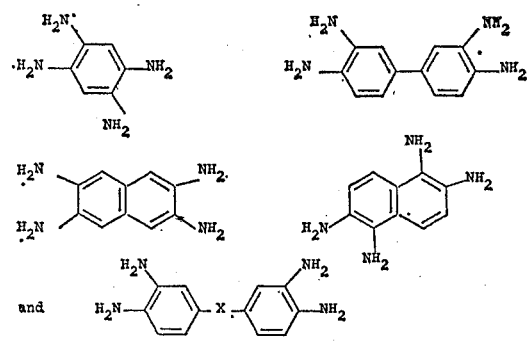

Where X represents any non-reactive radical capable of linking two aromatic nuclei such as —$(CR_1R_2)_n$— wherein $n$ is an integer of at least one, $R_1$ is hydrogen or lower alkyl and $R_2$ can be any groups defined by $R_1$, —O—, —S—,

and —$SO_2$—. Among such aromatic tetramines may be mentioned, for example, 1,2,4,5-tetraminobenzene, 1,2,5, 6-tetramino naphthalene, 2,3,6,7-tetraminonaphthalene, 3,3'-diaminobenzidine, 3,4,3',4'-tetramino diphenyl ether, 3,4,3',4'-tetramino diphenyl methane, 3,4,3',4'-tetramino diphenyl ethane, 3,4,3',4'-tetramino diphenyl-2,2-propane, 3,4,3',4'-tetramino diphenylthioether, and 3,4,3',4'-tetramino diphenylsulfone. These aromatic tetramines need not always be free amines but a portion of these amines may be inorganic acid salts, for example, tetramine-hydrochloride.

The aromatic dinitriles employed in this invention are compounds containing two nitrile groups attached to an aromatic nucleus, and compounds of the following formulae are preferred:

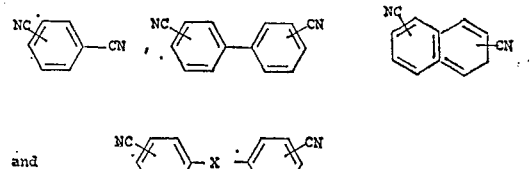

where X is as previously defined. For example, the following compounds can be suitably employed: terephthalonitrile, isophthalonitrile, phthalonitrile, 4,4'-biphenyldinitrile, naphthalene-1,4-dinitrile, naphthalene-1,6-dinitrile, naphthalene-2,6-dinitrile, diphenylether-4,4'-dinitrile, dinitrile, diphenylmethane-4,4'-dinitrile, diphenylsulfone-4,4'-dinitrile, diphenylthioether-4,4'-dinitrile.

Illustrative of the ammonium salts of inorganic acids which can be employed as promoters for the polycondensation reaction according to the present invention are, for example, ammonium chloride, ammonium nitrate, ammonium sulfate, ammonium phosphate, ammonium bromide, ammonium fluoride, ammonium bisulfate and ammonium bisulfite. Ammonium salts of organic sulfonic acids which can be suitably employed are, for example, ammonium salts of benzenesulfonic acid, toluenesulfonic acid, methanesulfonic acid, ethanesulfonic acid, naphthalenesulfonic acid, and the like. Ammonium salts of benzene and alkylbenzene sulfonic acids are the preferred ammonium salts or organic sulfonic acids; however, ammonium salts of inorganic acids are considered more preferable than the ammonium salts of organic sulfonic acids.

According to this invention, when an aromatic tetramine containing two pairs of ortho-disposed amino groups and an aromatic dinitrile are heated together, the polycondensation reaction proceeds as represented by the following equation which illustrates the reaction of 3,3'-diaminobenzidine and terephthalonitrile as a representative example of the polycondensation reaction of the present invention:

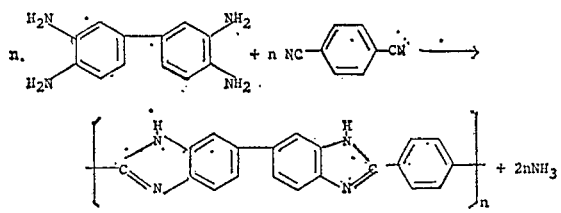

In the prior art process which comprises effecting a polycondensation reaction between an aromatic tetramine and a diphenyl ester of an aromatic dicarboxylic acid, it is necessary to employ high temperature and high vacuum or a stream of an inert gas in order to completely remove the released phenol or water from the reaction system. However, when an aromatic tetramine and an aromatic dinitrile are heated together in accordance with the present invention, as illustrated in the above equation, the reaction proceeds while releasing ammonia which is highly volatile and hence easy to remove from the reaction system. Therefore, it is possible for the reaction to proceed very smoothly under simple and convenient reaction conditions without the use of high vacuum or an inert gas stream.

In this invention, it is preferred to employ the aromatic dinitrils in a ratio of about one mole per mole of the aromatic tetramine. However, as distinguished from conventional polycondensation reactions, it is not considered necessary to maintain the amount of the aromatic dinitrile employed very close to one mole but instead, it can be varied within the range of from about 0.8 to about 1.2 moles per mole of the aromatic tetramine without any noticeable effect upon the reaction.

Although there is no real limit on the amount of the ammonium salt of an inorganic acid or the ammonium salt of an organic sulfonic acid to be employed in the present invention, generally it is considered preferable to employ at least about 0.004 mole of the ammonium salt per mole of the aromatic tetramine. While a very large amount of the ammonium salt may be used, if desired, use thereof in amounts in excess of about 3 moles will not bring about a proportional increase in promotion of the reaction. Preferably the ammonium salt is employed in an amount of from about 0.03 to about 1.5 moles per mole of the aromatic tetramine.

Thus, one of the features of the present invention is that the polycondensation reaction can be conducted in the absence of a solvent and in the presence of an ammonium salt of an inorganic acid or an organic sulfonic acid by heating a mixture of an aromatic tetramine and an aromatic dinitrile, and thereby obtaining high molecular weight aromatic polybenzimidazoles. Further, high vacuum need not be employed in the present invention. The reaction is generally conducted in a closed vessel under normal pressure or at elevated pressure, but the reaction can also be performed under reduced pressure, if desired. Reduction of pressure in the initial stages of the reaction should be limited to avoid substantial loss of the starting materials by sublimation or evaporation. Prior to reaction in accordance with the present invention, the aromatic tetramine, aromatic dinitrile and the ammonium salt as a promoter can be admixed in the form of a powder.

The polycondensation reaction according to the present invention can be conducted by heating the reaction mass at a temperature sufficiently high to melt the aromatic tetramine, the aromatic dinitrile or both of them at least during the initial stage of the reduction. Advantageously, the reaction can be conducted at from about 200° to about 450° C., and preferably from about 200° to about 400° C. It is considered preferable to continue heating at a temperature within said range until the polycondensation reaction is completed. Generally, a reaction time of from about 1 to about 3 hours is sufficient. A reaction period shorter than one hour can give satisfactory results by selecting suitable conditions such as the amount of the ammonium salt of inorganic acid or of organic sulfonic acid to be present in the reaction system and the reaction temperature. Reaction periods exceeding three hours can also be used. In this invention, as mentioned above, the reaction system need not be maintained in a molten condition until completion of the reaction. The reaction system can become solidified at a relatively early stage of the reaction, but the reaction can be proceed satisfactorily in a solid state to produce polymers of high molecular weights by maintaining the reaction temperature as indicated above.

Since the presence of molecular oxygen tends to cause side reactions such as oxidation reactions, in this invention, it is considered desirable to conduct the reaction in an atmosphere of an inert gas such as nitrogen or argon.

The aromatic polybenzimidazoles produced by the process of the present invention exhibit high heat stability, and can be employed for the production of various formed articles such as fibers, films and other materials having a wide field of application.

The present invention is further illustrated by the following examples. All percentages and parts are by weight unless otherwise indicated.

EXAMPLE 1

A mixture consisting of 6.24 grams of 3,3'-diaminobenzidine, 3.85 grams of isophthalonitrile and 0.50 gram of ammonium chloride was charged to a reaction vessel. After being purged with nitrogen, the vessel was sealed and the mixture was heated with the temperature being raised to 330° C. over a period of an hour. Although the internal pressure of the reaction vessel was increased due to generation of ammonia gas, heating was continued for 3 hours at 330° C. After completion of the reaction, the reaction mixture was allowed to cool to room temperature and the reaction vessel was opened to recover the coke-like polymer formed. After washing with a dilute aqueous solution of ammonia and pure water, the resulting polymer was dried at 100° C. for 2 hours under a reduced pressure. The yield of the polymer was 9.15 grams. The polymer was soluble in sulfuric acid, formic acid and dimethyl sulfoxide. The reduced viscosity of the polymer as determined in concentrated sulfuric acid at a concentration of 0.5 g./dl. at 30° C. was 0.84 dl./g. and that measured in 99% formic acid at a concentration of 0.3 g./dl. was 2.8 dl./g. Thermobalance measurements showed that there was no weight loss in air at temperatures lower than 540° C. The results of infrared and elemental analysis showed that the polymer had the polyphenylene benzimidazole structure. Brownish transparent stiff films were obtained from a dimethyl sulfoxide solution of the polymer.

CONTROL EXAMPLE 1

A mixture consisting of 6.42 grams of 3,3'-diaminobenzidine and 3.85 grams of isophthalonitrile was charged to a reaction vessel and the reaction was effected under the same conditions as in Example 1 except that ammonium chloride was not employed. The polymer obtained was a brittle solid. The reduced viscosity of the polymer measured in concentrated sulfuric acid at a concentration of 0.5 g./dl. at 30° C. was 0.32 dl./g., and that of the polymer in 99% formic acid at a concentration of 0.3 g./dl. at 30° C. was 0.58 dl./g.

In order to obtain a polymer of extremely high molecular weight similar to that of Example 1 (having a reduced viscosity of 0.84 dl./g. in concentrated sulfuric acid at a concentration of 0.5 g./dl. at 30° C.) by using the mixture described above, it was necessary to continue the reaction for about 4 hours at 400° C., and in addition, about 10% of the polymer formed was insoluble in sulfuric acid.

EXAMPLES 2-6

Various ammonium salts of inorganic acids and ammonium salts of organic sulfonic acids summarized in Table 1 were incorporated in a mixture of 6.42 grams of 3,3'-diaminobenzidine and 3.85 grams of isophthalonitrile. Reactions were effected under the same conditions as in Example 1 and high molecular weight polybenzimidazoles were obtained quantitatively by the same procedure. The results are summarized in Table 1 below.

TABLE 1

| Example | Ammonium salt | Amount of ammonium salt employed (grams) | Reduced viscosity (dl.g.)/ |
|---|---|---|---|
| 2 | Ammonium chloride | 1.00 | 0.93 |
| 3 | Ammonium sulfate | 0.60 | 0.65 |
| 4 | Ammonium salt of p-toluenesulfonic acid | 1.80 | 1.50 |
| 5 | Ammonium salt of benzenesulfonic acid | 1.00 | 1.20 |
| 6 | Ammonium nitrate | 0.45 | 0.78 |

The value of reduced viscosity in this table are the values measured in concentrated sulfuric acid at a concentration of 0.5 g./dl. at 30° C.

EXAMPLES 7-12

Aromatic tetramines, aromatic dinitriles and ammonium salts summarized in Table 2 were employed to effect polycondensation reactions in the same manner as Example 1 to quantitatively obtain high molecular weight aromatic polybenzimidazoles. The results obtained are summarized in Table 2.

TABLE 2

| Example | Tetramine | Amount (grams) | Dinitrile | Amount (grams) | Ammonium salt | Amount (grams) | Reduced viscosity (dl./g.) |
|---|---|---|---|---|---|---|---|
| 7 | 3,4,3',4'-tetramino diphenyl ether | 6.91 | Diphenylether-4,4'-dinitrile | 6.61 | Ammonium phosphate (monobasic) | 1.00 | 1.17 |
| 8 | 3,4,3',4'-tetramino diphenyl methane | 6.85 | Diphenylmethane-4,4'-dinitrile | 6.55 | Methanesulfonic acid ammonium salt | 1.10 | 1.22 |
| 9 | 3,4,3',4'-tetramino diphenyl sulfone | 8.35 | Diphenylsulfone-4,4'-dinitrile | 8.05 | α-Naphthalenesulfonic acid ammonium salt | 1.50 | 0.79 |
| 10 | 3,4,3',4'-tetramino diphenylthioether | 7.39 | Diphenylthioether-4,4'-dinitrile | 7.09 | Ammonium bromide | 0.90 | 0.89 |
| 11 | 2,3,6,7-tetramino naphthalene | 5.65 | Naphthalene-2,6-dinitrile | 5.34 | Ammonium sulfite | 1.17 | 0.95 |
| 12 | 1,2,5,6-tetramino naphthalene | 5.65 | Naphthalene-1,6-dinitrile | 5.34 | β-Naphthalenesulfonic acid ammonium salt | 2.05 | 0.98 |

In Table 2, the values of reduced viscosity are values obtained in concentrated sulfuric acid at a concentration of 0.5 g./dl. at 30° C.

EXAMPLE 13

A mixture consisting of 6.42 grams of 3,3'-diaminobenzidine, 3.85 grams of terephthalonitrile and 1.00 gram of terephthalonitrile and 1.00 gram of the ammonium salt of p-toluenesulfonic acid was charged to a reaction vessel. The vessel was purged with nitrogen, and then sealed under a reduced pressure of about 20 mm. Hg. The mixture was then heated at 320° C. for two hours. The resulting polymer was taken out of the reaction vessel, washed with a dilute aqueous solution of ammonia and pure water and then dried under reduced pressure. The yield of the polymer was 9.20 grams and its reduced viscosity measured in concentrated sulfuric acid at a concentration of 0.5 g./dl. at 30° C. was 0.66 dl./g., and that measured in 99% formic acid at a concentration of 0.3 g./dl. at 30° C. was 0.66 dl./g., and that measured in 99% formic acid at a concentration of 0.3 g./dl. at 30° C. was 1.8 dl./g. Results of infrared and elemental analysis showed that the polymer had the polyphenylene benzimidazole structure. Thermobalance measurements showed no weight loss in air at a temperature below 540° C., which means that the polymer has extremely high heat stability.

CONTROL EXAMPLE 2

A mixture of 6.42 grams of 3,3'-diamonobenzidine and 3.85 gram of terephthalonitrile was charged to a reaction vessel and the reaction was carried out under the same conditions as in Example 13 except that the ammonium salt of p-toluene sulfonic acid was not employed. A brittle solid polymer was obtained. The reduced viscosity of the polymer measured in concentrated sulfuric acid at a concentration of 0.5 g./dl. at 30° C. was 0.21 dl./g., and that measured in 99% formic acid at a concentration of 0.3 g./dl. at 30° C. was 0.30 dl./g.

In order to obtain extremely high molecular weight polymer similar to that of Example 13 (having a reduced viscosity of 0.66 dl./g. when measured in concentrated sulfuric acid at a concentration of 0.5 g./dl. at 30° C.) by using the mixture described above, it was necessary to continue the reaction for about 4 hours at a temperature of 390° C. and, in addition, about 20% of the resulting polymer was insoluble in sulfuric acid.

EXAMPLE 14

A mixture consisting of 6.91 grams of 1,2,4,5 - tetraminobenzene, 6.42 grams of isophthalonitrile and 1.20 grams of ammonium salt of p-toluenesulfonic acid was charged to a reaction vessel. After purging air with nitrogen, the reaction vessel was sealed and heated at 300° C. for two hours. Then the vessel was opened to release generated ammonia gas and heated again in the presence of a stream of nitrogen under atmospheric pressure at a temperature of 325° C. for one hour. The reduced viscosity of the resulting polybenzimidazole measured in concentrated sulfuric acid at a concentration of 0.5 g./dl. at 30° C. was 1.30 dl./g.

EXAMPLE 15

A mixture consisting of 4.28 grams of 3,3'-diaminobenzidine, 4.08 gram of 4,4'-diphenyldinitrile and 0.75 gram of the ammonium salt of benzene sulfonic acid was charged to a reaction vessel. After purging air with nitrogen, the reaction vessel was sealed under a reduced pressure of 4 mm. Hg and thereafter the mixture was heated at a temperature of 300° C. for two hours. The vessel was then opened to remove generated ammonia gas and thereafter the vessel was heated further at a temperature of 305° C. under a reduced pressure of 4 mm. Hg for one hour. The reduced viscosity of the resulting polybenzimidazole was 1.37 dl./g. when measured in concentrated sulfuric acid at a concentration of 0.5 g./dl. at 30° C.

What is claimed is:

1. A process for the production of an aromatic polybenzimidazole which comprises heating a mixture of an aromatic tetramine containing two groups of amine substituents, said amine substituents in each group being in an ortho position relative to each other, and an aromatic dinitrile at a temperature sufficiently high to maintain at least one of the reactants in a molten state at least during the initial stage of the reaction, in the presence of an ammonium salt of an acid selected from the group consisting of inorganic acids and organic sulfonic acids, until the polycondensation reaction is completed.

2. The process according to claim 1 wherein the ammonium salt of an acid selected from the group consisting of inorganic acids and organic sulfonic acids is employed in an amount from about 0.004 to about 3 moles per mole of the aromatic tetramine.

3. The process according to claim 2 wherein the ammonium salt of an acid selected from the group consisting of inorganic acids and organic sulfonic acids is employed in an amount from about 0.03 to about 1.5 moles per mole of the aromatic tetramine.

4. The process according to claim 1 wherein the aromatic dinitrile is employed in an amount of from about 0.8 to about 1.2 moles per mole of the aromatic tetramine.

5. The process according to claim 1 wherein the polycondensation reaction is conducted at a temperature of from about 200° to about 450° C.

6. The process according to claim 1 wherein the polycondensation reaction is conducted for a reaction period of from about 1 to about 3 hours.

7. The process according to claim 1 wherein the aromatic tetramine is 3,3'-diaminobenzidine and the aromatic dinitrile is isophthalonitrile.

8. The process according to claim 1 wherein the ammonium salt of an inorganic acid is ammonium chloride.

9. The process according to claim 1 wherein the polycondensation reaction is conducted in an inert atmosphere.

10. A process for the production of an aromatic polybenzimidazole which comprises heating a mixture of an aromatic tetramine containing two groups of amine substituents, said amine substituents in each group being in an ortho position relative to each other, and an aromatic dinitrile, said aromatic dinitrile being employed in an amount ranging from about 0.8 to about 1.2 moles per mole of said aromatic tetramine, at a temperature ranging from about 200° to about 400° C., in the presence of an ammonium salt of an inorganic acid, said ammonium salt being employed in an amount of from about 0.004 to about 3 moles per mole of said aromatic tetramine, thereby effecting the polycondensation reaction.

References Cited

UNITED STATES PATENTS 3,313,783   4/1967   Iwakura et al. _____ 260—78
3,509,108   4/1970   Prince _____ 260—78.4

JOSEPH L. SCHOFER, Primary Examiner

J. KIGHT III, Assistant Examiner

U.S. Cl. X.R.

260—47 R